United States Patent [19]

Tsumura et al.

[11] Patent Number: 5,291,548
[45] Date of Patent: Mar. 1, 1994

[54] DISTRIBUTED TELEPHONE CONFERENCE CONTROL DEVICE

[75] Inventors: Mihoji Tsumura; Masato Hata, both of Osaka, Japan

[73] Assignee: Ricos Co., Ltd., Japan

[21] Appl. No.: 714,198

[22] Filed: Jun. 12, 1991

[30] Foreign Application Priority Data

Dec. 21, 1990 [JP] Japan ................. 2-413110

[51] Int. Cl.⁵ .............. H04M 3/42; H04M 1/64; H04M 3/00
[52] U.S. Cl. ...................... 379/204; 379/88; 379/93; 379/203; 379/269
[58] Field of Search .......... 379/67, 88, 89, 202, 379/203, 205, 204, 206, 93, 269

[56] References Cited

U.S. PATENT DOCUMENTS 4,475,189 10/1984 Herr et al. .............. 379/202 X
5,113,431 5/1992 Horn .................... 379/205 X Primary Examiner—James L. Dwyer
Assistant Examiner—Harry S. Hong
Attorney, Agent, or Firm—Thompson, Hine and Flory

[57] ABSTRACT

A device which enables two or more users of outside lines to converse on equal terms with each other. The connection method provides a distributed form of processing. The outside lines are connected to corresponding voice signal lines which intersect with two-party conference lines which serve as connectors for two voice signal lines, and multiple party conference lines which serve as connectors for three or more voice signal lines. Connection is possible at any intersection point. The device is also fitted with a conference line selection signal decoder to enable connection of a voice signal line with a specific conference line as specified by an incoming signal. Exclusion control lines are fitted to prevent the connection of more than two voice signal lines to the same two-party conference line. The voice signal lines are connected to a voice processor to enable the output of voice signals to an outside line.

8 Claims, 2 Drawing Sheets

DISTRIBUTED TELEPHONE CONFERENCE CONTROL DEVICE

BACKGROUND OF THE INVENTION

1. Field of the Invention

This invention relates to a distributed telephone conference control device which enables the use of ordinary telephone lines for two-party or multiparty conferencing.

2. Description of the Prior Art

The telephone equipment itself can, if employed in the normal way, be used simply to facilitate a conversation between two parties using a telephone line. However, if three or more parties wish to use the telephone to converse with each other at the same time, then a special configuration is required. In other words, real time control must be maintained in respect of multiple telephone lines while at the same time ensuring that all said lines are connected with each other on equal terms.

In order to provide the private sector with the sort of device which would enable conferencing between three or more parties, it would be possible to think in terms of, for example, a central control unit from which would radiate a number of telephones lines connected in order. The central control unit would exercise centralized control over the telephone lines concerned whenever a number of people wished to hold a telephone conference.

A central control unit would, in fact, be indispensable to the sort of technique outlined above while the scope of line control would be limited by the processing capacity of said control unit. Assuming, however, that the number of telephone lines connected into the system is likely at some future point to be increased, it is clearly going to be necessary to install a high speed processing device and this in turn introduces the problem of high initial costs. Furthermore, since the central control unit will be controlling all the lines connected into the system at the same time, this will fairly naturally place a heavy load on the system as a whole and there is a strong possibility that this may prove to be a source of future faults. Moreover, even if a central control unit with substantial capacity is installed from the outset, repeated increases in the numbers of lines connected into the system will eventually bring the central control unit to the limit of its capacity and it will then be necessary to replace it with an even more powerful unit. This brings us back to a critical problem which is that it is not possible to forecast with any degree of accuracy the future subscriber load.

It would equally be possible to digitalize voice signal lines for control by computer and to connect a number of such computers into a LAN (LOCAL AREA NETWORK). The problem here, however, would be the rapid transfer of data between units and the system would not, in fact, be realistic from the point of view of real time processing.

SUMMARY OF THE INVENTION

It is thus a general object of the invention to resolve the sorts of problems outlined above and, by controlling the connections between a number of telephone lines on which incoming calls have been made to the invention, to provide the facility for telephone conferencing between two or more persons through the selective connection either of two parties or of more than two parties as required.

It is another object of the invention to supply a device which is capable of real time control of a number of telephone lines which are connected to said device.

It is still another object of the invention to control a number of telephone lines without resort to a central control unit and, by doing everything possible to prevent the concentration of load at one specific point, to eliminate the situation whereby the whole unit is put out of action as a result of the breakdown of just a part of the system.

It is a further object of the invention to supply a device which will dispense with the use of a LAN based system and will facilitate the connection of additional telephone lines with relative ease.

In order to accomplish the objects outlined above, the invention has been provided with a number of voice signal lines each corresponding to one of a number of outside lines, a number of two-party conference lines for the electrical connection of two voice signal lines with each other and a number of multiparty conference lines for the electrical connection of three or more voice signal lines with each other. The invention has also been provided with a conference line selection signal decoder to enable connection of an outside line with a conference line specified in accordance with an incoming signal from said outside line, exclusion control lines to prevent the connection of more than two outside lines to the same two-party conference line and connection to a voice processor to enable voice output from said voice signal lines to outgoing lines.

The objects of the invention outlined above plus other objects, features and merits not outlined above may be clarified by reference to the following detailed explanations and drawings.

DESCRIPTION OF THE PREFERRED EMBODIMENTS

Figure 1:
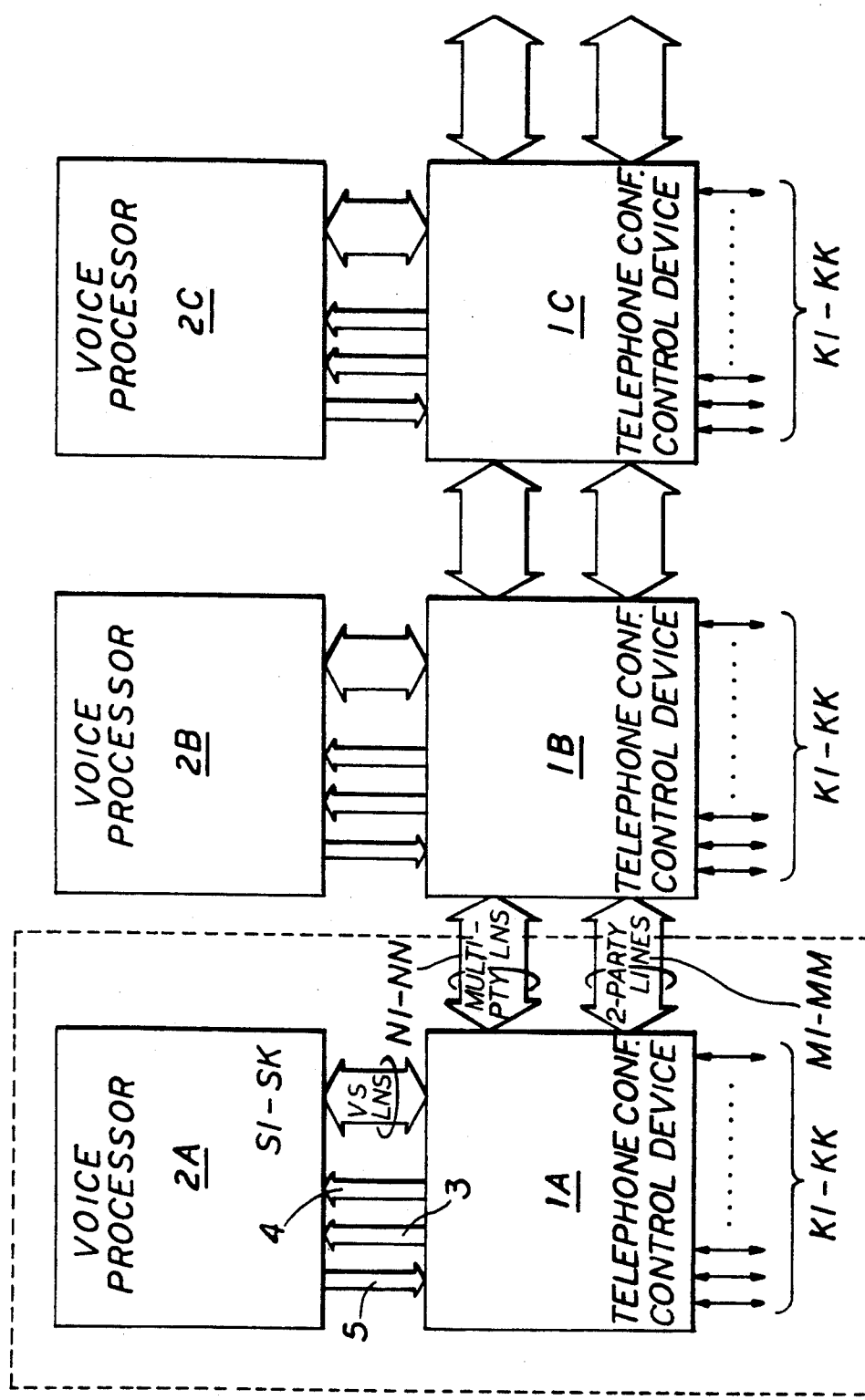
FIG. 1 is a block diagram illustrating the basic features of the distributed telephone conference control device of the invention.

FIG. 1 shows the telephone conference control devices 1A, 1B and 1C, which represent the invention, each connected to its own corresponding voice processor, 2A, 2B and 2C, and each interconnected by control wires. K number of outside lines K1 to KK from an external telephone network are connected to the telephone conference control device 1. The connection of outside lines K1 to KK with the telephone network can be configured in such a way that either each line has its own telephone number and can therefore receive a call individually or else all the lines are treated as a single line and assigned a single exchange number such that when calls are made to the said exchange number then each call is connected in sequence to the next available outside line. Telephone conference control device 1 has M number of two-party conference control lines M1 to MM and N number of multiparty conference control lines N1 to NN. These control lines are shown running horizontally in the figure. Voice signal lines S1 to SK, which are shown running vertically in the figure, intersect both with the two-party conference lines M1 to MM and also with the multiparty conference lines N1 to NN. It is possible to connect a voice signal line with a conference line at any one of these intersections. By selectively combining the voice signal lines with any one of the two-party conference lines it is thus possible to electrically interconnect the two outside lines which are connected to the voice signal lines, and by combining the voice signal lines with any one of the multiparty conference lines it is possible to electrically interconnect on equal terms the three or more outside lines which are connected to the voice signal lines. The number of lines corresponding to each of the values at K, M and N above is optional and limited only by the physical capacity of telephone conference control device 1. The voice processor 2 is activated when an outside line is connected to the telephone conference control device 1. For example, the necessary messages giving instructions relating to matters such as the selection either of two-party or of multiparty conferencing are transmitted by the voice signal lines S1 to SK to the caller on the outside line in question. If an interconnection is made by the conference line with another user's outside line then the connection is automatically released.

Each of the telephone conference control devices 1A, 1B and 1C are physically separate from each other but they are linked by the extension of two-party conference lines M1 to MM and multiparty conference lines N1 to NN in such a way that they operate just as if they were a single unit. In this way it is possible to connect as many devices in parallel as may be required, the total number so connected being restricted only by such limitations as may be imposed by the physical circumstances. The functioning of the system is equally not impaired if the number of outside lines connected to each of the telephone conference control devices 1A, 1B and 1C is different in each case.

Telephone conference control device 1 and voice processor 2 are not only connected electrically by a number of voice signal lines S1 to SK, which corresponds to the number of outside lines K, but also by control line 3 which indicates the current operating status of each of the outside lines and by control line 4 which indicates what sort of conference status has been selected by each of the outside lines. Both of these control lines are connected to indicators (not shown in the figure) which are incorporated into voice processor 2. The telephone conference control device 1 and the voice processor 2 are also linked by a call origination control line 5 which is used for operations such as the origination of calls to individual outside lines from the voice processor 2 and the disconnection of engaged circuits.

The following is a general explanation of the functions of each of the aforementioned telephone conference control device 1 and voice processor 2. First, by switching at the point in the telephone conference control device at which the voice signal lines S1 to SK intersect with the two-party conference lines M1 to MM and the multiparty conference lines N1 to NN, two specific voice signal lines can be electrically connected by means of the specified two-party conference line to enable a telephone conference between two different parties. In the same way three or more voice signal lines can be electrically connected by a specified multiparty conference line to enable a multiparty telephone conference. The voice processor 2 incorporates a function whereby when it first responds to a call from an outside line it asks the caller to specify, for example, the conference line to which he wants his own line to be connected and then connects the line to the conference line indicated by the code input by said caller. The voice processor 2 is also able to transmit appropriate data to the caller if so required. When the voice processor 2 makes a connection with an outside line then it will also display the ensuing connection status on an indicator for monitoring purposes.

Figure 2:
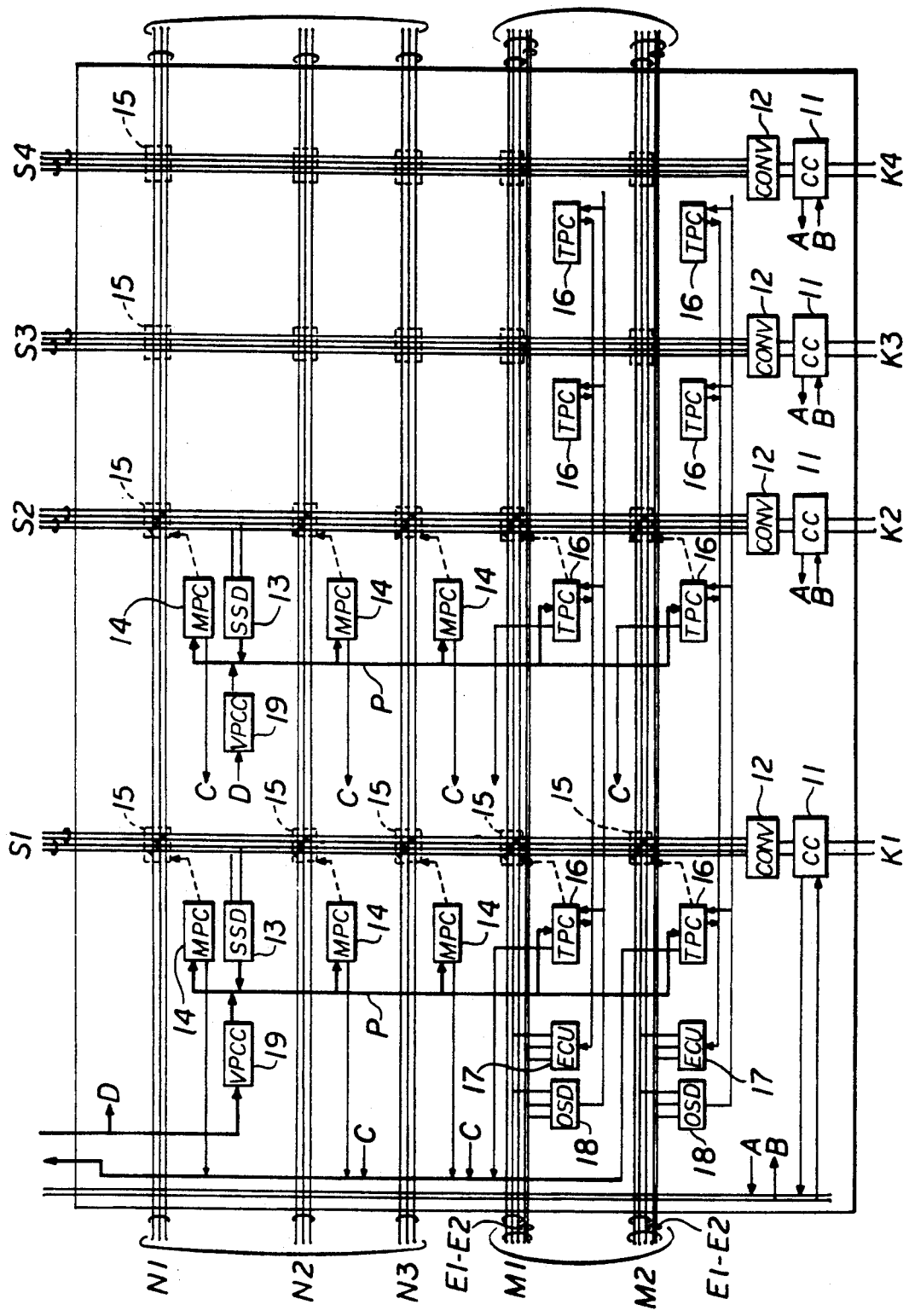
FIG. 2 is a wiring diagram illustrating the connection status of each part of the invention.

FIG. 2 is a wiring diagram illustrating the configuration of the wiring inside each of the telephone conference control devices 1A, 1B and 1C. The example shown in the figure consists of four outside lines K1 to K4 which connect directly with voice signal lines S1 to S4, two two-party conference lines M1 and M2 and three multiparty conference lines N1 to N3. The outside lines K1 to K4 are each connected to telephone lines which are in turn connected to an external telephone network as explained above. When a caller puts in a call to this control device, the incoming call is placed under the control of the incoming and outgoing call controller 11 and the incoming call status is at the same time displayed for monitoring purposes on the outside line status indicator incorporated into the voice processor 2. Each outside line consists of two separate lines, an incoming and an outgoing line. It is, however, necessary to split each of these two lines into two further lines corresponding to the speaker and the microphone in the telephone receiver and for this purpose the outside lines are passed through a two-wire: four-wire converter 12 where they are converted into voice signal lines S1 to S4, each of which consists of a set of four separate wires. These are then connected to the voice processor 2.

To enable the incoming caller to select either a two-party or a multiparty conference line as required, there is a conference line selection signal decoder 13 connected to the two incoming lines of each of the four voice signal lines. The pulse or tone signal generated by the dial or push button input of the caller is subsequently detected by the conference line selection signal decoder 13 which then transmits a signal using a predetermined code sequence to control line P and thereby connects the specified two-party or multiparty conference line with the voice signal line. 14 is a multiparty conference connection controller which is used to connect a voice line to a specified multiparty conference line. There is an individual multiparty conference line connection controller corresponding to each of the selector switches 15 which are set at each of the intersections between the voice signal lines S1 to S4 and the multiparty conference lines N1 to N3. When the multiparty conference line connection controller 14 receives a control signal output by the conference line selection signal decoder 13, it activates its corresponding selector switch 15 which then makes the required connection. 16 is a two-party conference line connection controller one of which is fitted for each selector switch 15 (ratio 1:1) which is set at each of the intersections between the voice signal lines S1 to S4 and the two-party conference lines M1 and M2. When the two-party conference connection controller 16 receives a control signal output by the conference line selection signal decoder 13, it secures the appropriate operation of its corresponding selector switch 15 in order either to connect or to disconnect the voice signal line and the specified two-party conference line. The two-party conference lines signified by the letter M are reserved for two party conversations only and for this reason they are also combined with two control lines, the exclusion control lines E1 and E2, which indicate the operating status of each line. Exclusion control unit 17 is used to set one of four possible two bit logic values (00, 01, 10, 11) on these control lines. For example, the status of a two-party conference line which was not in use would be indicated by a logic value of 00 whereas if one or other of the lines were connected then these statuses would be indicated by the logic values 01 or 10. In a situation where both lines of a two-party conference line are connected the status would be indicated by a logic circuit value of 11. Corresponding to each of the two-party conference connection controllers 16 there is an operating status detector 18 which detects the logic value of the two-party conference line which it then uses to determine whether the line is available for connection to an outside line or not. Moreover, when a specific exclusion control unit connects an outside line with a two-party conference line then it also simultaneously alters the logic values of the specific E1 and E2 exclusion control lines to which it is connected. The exclusion control unit makes it clear at this point whether the two-party conference line in question is available for connection to an outside line or not.

19 is the voice processor connection controller which analyses signals sent by the voice processor 2 and then transmits a switching signal either to the two-party conference line connection controller 16 or to the multiparty conference line connection controller 14. In other words, the use of this device means that the system is not solely dependent on control signals from outside lines K1 to K4 but can also control the connection status of outside lines directly from the voice processor 2.

In this way a caller can, acting on the basis of information such as messages sent to him from the voice processor, use his dial or push button equipment to select either a two-party conference line or a multiparty conference line in accordance with his requirements. The fact that the number of control lines is greater in the case of the two-party conference lines, signified by the letter M, than in the case of the multiparty conference lines, signified by the letter N, is because although any number of outside lines can be connected to a multiparty conference line, as explained above, only two outside lines can be connected to a two-party conference line. The connection of more than two outside lines to a two-party conference line must therefore be inhibited and the exclusion control lines E1 and E2 are thus also required.

To sum up, the configuration of the invention is such that voice signal lines connecting with outside lines crisscross with two-party and multiparty conference lines in a pattern much like that of a checkerboard. A selector switch is set at each of the intersections so formed such that by activating a specific selector switch it is possible to connect a single voice signal line with a specific conference line thereby enabling a caller on a given outside line to participate in either a two-party or a multiparty conference. Moreover, since any number of outside lines can be connected to a multiparty conference line but no more than two outside lines must be connected at any one time to a two-party conference line, exclusion control lines are also fitted.

In the preferred embodiment the sequence of operations entailed by the connection of an outside line is as follows. First, let us assume that a call has been received on outside line K1 from the external telephone network. The incoming signal is electrically connected with the voice processor 2 after first passing through the incoming and outgoing signal controller 11 and subsequently being converted into a four-wire voice signal line S1 by the two-wire: four-wire converter 12. At the same time control lines 3 and 4 are used to transmit the incoming signal status to the voice processor 2 which then displays this information on one of its indicators. The voice processor 2 is itself able to transmit such prerecorded messages as may be required to outside line K1. Next the caller on outside line K1 decides on the basis of the message received whether he requires a two-party conference line or a multiparty conference line and then inputs the appropriate selection signal by means of a dial or push button operation as appropriate. This signal is then transmitted along the incoming line of the voice signal line S1 and input to the conference line selection signal decoder 13 which in turn activates the specified connection controller 14 or 16 in accordance with the control signal generated. Specified connection controller 14 or 16 then activates the particular selector switch 15 to which it corresponds and outside line K1 is thereby connected with the two-party or multiparty conference line required. Moreover, since connection with multiparty conference lines N1 to N3 is not subject to any limitation imposed by other outside line connections, any of the desired lines can be selected. In the case of two-party conference lines M1 and M2, however, such free selection is not possible and connection must necessarily be made with whichever of the two lines is free. It would, of course, be possible to increase the number of predetermined signals to permit a conversational exchange with the voice processor 2 such that the operating statuses of the two-party conference lines M1 and M2 could be advised to the caller and selection subsequently made of the required two-party conference line. In this sort of case it would, of course, be necessary for the caller on outside line K1 for which connection had already been completed, to wait in this condition until such time as another outside line was connected to the same conference line. In the preferred embodiment outlined above outside line K1 was used as an example but exactly the same procedure would apply for any of the other outside lines from K2 through to K4. Although much of the detail has been omitted from the figure in respect of outside lines K3 and K4, the conference line and control line relationships are the same as for outside lines K1 and K2.

Since in this invention a fixed number of outside lines connected to a single device can each be electrically connected to any one of a number of conference lines, the outside line connection operation itself is not concentrated in one specific mechanism but is subject to a distributed form of control. Thus even if a particular conference line or a part of that conference line develops a fault, the remaining mechanisms can continue to function normally thereby making the device extremely reliable.

There are also two types of conference line, namely the two-party conference lines represented by the symbols M1 to MM and the multiparty conference lines represented by the symbols N1 to NN, either of which can be selected as required by the caller. In the case of the two-party conference lines M1 to MM, exclusion control lines E1 and E2 are also fitted to inhibit the connection of other outside lines, thereby enabling conversations to be kept private as before.

If it proves necessary to increase the number of outside lines then this can be easily achieved with this invention simply by linking further units in parallel as required. Moreover, since the addition of further units calls only for the connection of the conference lines which run from side to side, the demand for an urgent extension to the overall facility can quickly be met. Furthermore, the addition of further units does not result in any lengthening of the required processing time and there is thus no impairment of the basic functional feature of real time processing.

What is claimed is:

1. A distributed telephone conference control system for selectively connecting any of a plurality of telephone lines of a telephone network, comprising:

a telephone conference control device having
   a plurality of voice signal lines each of which is respectively connected to one of said plurality of telephone lines,
   means for converting signals from said telephone lines to signals on said voice signal lines,
   a plurality of two-party conference lines selectively connectable between any two of said voice signal lines,
   a plurality of multiparty conference lines selectively connectable between any three or more of said voice signal lines,
   conference line selection signal decoder means for connecting two or more of said voice signal lines to a selected one of said two-party and multiparty conference lines, in accordance with an incoming signal received from any one of said telephone lines,
   a plurality of exclusion control lines, each of said exclusion control lines indicating a connection status of an associated one of said two-party conference lines,
   operating status detector means for detecting logic values of said exclusion control lines to determine whether an associated one of said two-party conference lines is available for connection between said voice signal lines,
   a voice processor connected to said voice signal lines for outputting message signals to an outgoing one of said voice signal lines, and
   a voice processor connection controller connected to said voice processor for controlling connections between said telephone lines and said conference lines; and means for connecting a plurality of said telephone conference control devices in parallel.

2. The distributed telephone conference control system according to claim 1 wherein each of said voice signal lines includes four voice line elements; each of said telephone lines includes two telephone line elements; and in which the two telephone line elements are converted to the four voice line elements by means of a two-wire: four-wire converter.

3. The distributed telephone conference control device according to claim 1 in which each of the intersections between said voice signal lines and a two-party conference line or said voice signal lines and a multiparty conference line is fitted with a selector switch, and in which each one of said selector switches can be activated by signals output by said conference line selection signal decoder means to make an electrical connection between said voice signal lines and the particular conference line which has been specified.

4. The distributed telephone conference control system according to claim 1 in which a control signal is output from said voice processor and input to said voice processor connection controller which then operates a selector switch which has been specified by said control signal.

5. The distributed telephone conference control system according to claim 1 in which each of said plurality of exclusion control lines consists of two wires which indicate connection status of a particular two-party conference line to which said exclusion control line corresponds by storing one of four possible logical states determined by two bit logic.

6. The distributed telephone conference control system according to claim 1 which consists of a number of telephone conference control devices linked in parallel by a number of two-party and multiparty conference lines.

7. The distributed telephone conference control system according to claim 1 in which a connection status for each of said telephone lines is transmitted from a signal controller to said voice processor by means of a control line.

8. The distributed telephone conference control system according to claim 1 with four telephone lines.

* * * * *